# (12) United States Patent
Kendall (10) Patent No.: US 12,112,267 B2
(45) Date of Patent: *Oct. 8, 2024

(54) LEARNING IN TIME VARYING, DISSIPATIVE ELECTRICAL NETWORKS

(71) Applicant: Rain Neuromorphics Inc., San Francisco, CA (US)

(72) Inventor: Jack David Kendall, San Mateo, CA (US)

(73) Assignee: Rain Neuromorphics Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,184

(22) Filed: Dec. 7, 2022

(65) Prior Publication Data

US 2023/0127533 A1 Apr. 27, 2023

Related U.S. Application Data

(63) Continuation of application No. 17/685,335, filed on Mar. 2, 2022, now Pat. No. 11,551,091.

(60) Provisional application No. 63/157,477, filed on Mar. 5, 2021.

(51) Int. Cl.
*G06N 3/08* (2023.01)
*G06N 3/063* (2023.01)

(52) U.S. Cl.
CPC ............. *G06N 3/08* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 8,675,391 B2 | 3/2014 | Snider |
| 10,127,494 B1 | 11/2018 | Cantin |
| 10,198,691 B2 | 2/2019 | Nino |
| 10,290,801 B2 | 5/2019 | Narayanan |
| 10,332,004 B2 | 6/2019 | Kataeva |
| 10,515,312 B1 | 12/2019 | Kubo |
| 10,643,694 B1 | 5/2020 | Alessandri |
| 11,138,500 B1 | 10/2021 | Mountain |
| 11,468,145 B1 | 10/2022 | Duong |
| 2007/0043452 A1 | 2/2007 | Buscema |

(Continued)

FOREIGN PATENT DOCUMENTS

| | | |
|---|---|---|
| WO | 2009113993 | 9/2009 |
| WO | 2021030063 | 2/2021 |

OTHER PUBLICATIONS

Allison et al., A Variational Approach to the Analysis of Dissipative Electromechanical Systems, PLOS One, Feb. 2014, vol. 9, Issue 2, pp. 1-12.

(Continued)

*Primary Examiner* — Vincent Gonzales
(74) *Attorney, Agent, or Firm* — Van Pelt, Yi & James LLP (57) ABSTRACT

A method for performing learning in a dissipative learning network is described. The method includes determining a trajectory for the dissipative learning network and determining a perturbed trajectory for the dissipative learning network based on a plurality of target outputs. Gradients for a portion of the dissipative learning network are determined based on the trajectory and the perturbed trajectory. The portion of the dissipative learning network is adjusted based on the gradients.

21 Claims, 4 Drawing Sheets

(56) References Cited

U.S. PATENT DOCUMENTS

| | | |
|---|---|---|
| 2011/0096589 A1 | 4/2011 | Bratkovski |
| 2015/0357566 A1 | 12/2015 | Wang |
| 2016/0379110 A1 | 12/2016 | Eleftheriou |
| 2017/0098156 A1 | 4/2017 | Nino |
| 2018/0165573 A1 | 6/2018 | Hsu |
| 2018/0309451 A1 | 10/2018 | Lu |
| 2018/0336470 A1 | 11/2018 | Kendall |
| 2018/0367022 A1 | 12/2018 | Gopalraju |
| 2019/0005402 A1 | 1/2019 | Mohseni |
| 2020/0035305 A1 | 1/2020 | Choi |
| 2020/0090045 A1 | 3/2020 | Baker |
| 2020/0272893 A1 | 8/2020 | Danial |
| 2021/0125070 A1 | 4/2021 | Wang |
| 2021/0201136 A1 | 7/2021 | Chalamalasetti |
| 2022/0036199 A1* | 2/2022 | Prasanna ............... G06N 3/006 |

OTHER PUBLICATIONS

Benjamin Scellier, Implementing Equilibrium Prop on Analog Circuits, Jun. 27, 2019.

Fred Riewe, Nonconservative Lagrangian and Hamiltonian Mechanics, Physical Review E, vol. 53, No. 2, Feb. 1996, pp. 1890-1899.

Hollis et al. A neural network learning algorithm tailored for VLSI implementation. IEEE transactions on neural networks. Sep. 1994;5(5):784-91. (Year: 1994).

J. Tenreiro Machado, Fractional Generalization of Memristor and Higher Order Elements, 2013.

Kendall et al., Training End-to-End Analog Neural Networks with Equilibrium Propagation, Jun. 9, 2020, pp. 1-31.

Liao et al. Self-sustained oscillation in a memristor circuit. Nonlinear Dynamics. Apr. 2019;96(2): 1267-81. (Year: 2019).

Pantone et al., Memristive Nanowires Exhibit Small-World Connectivity, Neural Networks 106 (2018) 144-151, available online Jul. 17, 2018.

Scellier et al., Equilibrium Propagation: Bridging the Gap between Energy-Based Models and Backpropagation, published May 4, 2017, vol. 11, Article 24.

Soudry et al., Memristor-Based Multilayer Neural Networks with Online Gradient Descent Training, IEEE Transaction on Neural Networks and Learning Systems, vol. 26, No. 10, Oct. 2015, pp. 2408-2421.

Suri et al., Bio-Inspired Stochastic Computing Using Binary CBRAM Synapses, IEEE Transactions on Electron Devices, vol. 60, No. 7, Jul. 2013, pp. 2402-2409.

Will Johnson, Nonlinear Electrical Networks, Aug. 16, 2010.

William Millar, The London Edinburgh, and Dublin Philosophical Magazine and Journal of Science: Series 7, CXVI. Some General Theorems for Non-Linear Systems Possessing Resistance, 1951.

Wen et al: "An EDA framework for large scale hybrid neuromorphic computing systems", 2015 52nd ACM/EDAC/IEEE Design Automation Conference (DAC), IEEE, Jun. 8, 2015 (Jun. 8, 2015), pp. 1-6.

Jeong et al: "Parasitic Effect Analysis in Memristor-Array-Based Neuromorphic Systems", IEEE Transactions on Nanotechnology, IEEE, USA, vol. 17, No. 1, Jan. 1, 2018 (Jan. 1, 2018), pp. 184-193.

\* cited by examiner

LEARNING IN TIME VARYING, DISSIPATIVE ELECTRICAL NETWORKS

CROSS REFERENCE TO OTHER APPLICATIONS

This application is a continuation of U.S. patent Ser. No. 17/685,335 entitled LEARNING IN TIME VARYING, DISSIPATIVE ELECTRICAL NETWORKS filed Mar. 2, 2022, which claims priority to U.S. Provisional Patent Application No. 63/157,477 entitled SYSTEM FOR PERFORMING GRADIENT ESTIMATION IN TIME VARYING ELECTRICAL NETWORKS filed Mar. 5, 2021, both of which are incorporated herein by reference for all purposes.

BACKGROUND OF THE INVENTION

In order to perform machine learning in hardware, particularly supervised learning, the desired output is to be achieved from a particular set of input data. For example, input data is provided to a first layer of a neural network. The input data is multiplied by a matrix of values, or weights, in the layer. The output signals for the layer are the result of the matrix multiplication in the layer. The output signals are provided as the input signals to the next layer of matrix multiplications then passed through nonlinearity. This process may be repeated for a large number of layers. The final output signals of the last layer are desired to match a particular set of target values. To perform machine learning, the weights (e.g. synapse resistances) in one or more of the layers are adjusted in order to bring the final output signals closer to the target values. Although this process can theoretically alter the weights of the layers to provide the target output, in practice, ascertaining the appropriate set of weights is challenging. Various mathematical models exist in order to aid in determining the weights. However, it may be difficult or impossible to translate such models into devices and/or to use such models for certain applications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Learning networks (e.g. artificial neural networks) utilized in machine learning, or deep learning, are generally many-layered or hierarchical structures. Layers of neurons are interleaved with weighting layers. The input signals (e.g. an input vector) are multiplied by a matrix of values, or weights, in each weighting layer. For example, in neuromorphic hardware, the weighting layer is typically an array of programmable resistances in which the resistances serve as weights. The output signals for the weighting layer are provided as input signals to the corresponding neuron layer. The outputs of a neuron layer are provided as inputs to the next weighting layer. This may be repeated for the remaining weighting and neuron layers of the learning network.

The final output signals of the last layer of the learning network are desired to be matched to a set of target values. To do so, the weights in one or more of the layers are adjusted. For example, the gradients for each weighting layer that would bring the final output signals to the set of target values are determined and the weights in each weighting layer adjusted accordingly. Theoretically, this process can alter the weights of the layers to provide the target output. In practice, however, determining the weights based on the target values for the output of the learning network is challenging. For example, techniques such as stochastic gradient descent are used to adjust the weights. Gradient descent determines the gradients for the weights that will align the output of the learning system with the target outputs. However, there are ongoing issues with such techniques.

Equilibrium propagation is another technique that can be used to locally estimate gradients for a static learning network having static input signals. However, equilibrium propagation may be unsuitable for time varying input signals, time varying learning networks (e.g. learning networks including components having current-voltage characteristics that vary over time), and/or for learning networks which exhibit dissipation (e.g. for real learning networks that include dissipative elements). Consequently, an improved technique for performing machine learning is desired.

A method for performing learning (e.g. deep or machine learning) in a dissipative learning network is described. The method includes determining a trajectory for the dissipative learning network and determining a perturbed trajectory for the dissipative learning network based on target outputs. Gradients for a portion of the dissipative learning network are determined based on the trajectory and the perturbed trajectory. The portion of the dissipative learning network is adjusted based on the gradients. In some embodiments, the dissipative learning network includes a neuron bank interleaved with weighting arrays. The portion of the dissipative learning network that is adjusted includes the weighting arrays. In some embodiments, determining the gradients includes fractionally integrating the trajectory to provide a fractionally integrated trajectory and fractionally integrating the perturbed trajectory to provide a fractionally integrated perturbed trajectory. The gradients are determined by determining a difference between the fractionally integrated trajectory and the fractionally integrated perturbed trajectory for each weight in the plurality of weighting arrays. This difference corresponds to a gradient for each weight.

In some embodiments, sampling is used to determine the trajectory and the perturbed trajectory. Thus, determining the trajectory includes sampling the trajectory at a first time and a second time to identify a first sampled trajectory and a second sampled trajectory. Determining the perturbed trajectory includes sampling the perturbed trajectory at a third time and a fourth time to identify a first sampled perturbed trajectory and a second sampled perturbed trajectory. Fractionally integrating the trajectory includes interpolating between the first sampled trajectory and the second sampled trajectory to provide a fractionally integrated sampled trajectory. Similarly, fractionally integrating the perturbed trajectory includes interpolating between the first sampled perturbed trajectory and the second sampled perturbed trajectory to provide a fractionally integrated sampled perturbed trajectory. Determining the difference between the fractionally integrated and fractionally integrated perturbed trajectories includes determining a first difference between the fractionally integrated sampled trajectory and the fractionally integrated sampled perturbed trajectory for each weight in the weighting arrays. The first difference corresponds to the gradient for each weight.

In some embodiments, determining the trajectory includes providing at least one input signal to the dissipative learning network and sampling the weighting arrays while the input signal(s) are provided. In some such embodiments, determining the perturbed trajectory includes coupling the dissipative learning network to a loss circuit. The loss circuit determines a difference between output signal(s) from the dissipative learning network and the target outputs. The loss circuit also provides clamping signals to the dissipative learning network based on the difference. The input signal(s) are provided to the dissipative learning network while the dissipative learning network is coupled to the loss circuit. The weighting arrays are sampled while the input signal(s) are provided to the dissipative learning network and the dissipative learning network is coupled to the loss circuit.

Each neuron bank may have neurons including circuit elements. The circuit elements include at least one nonlinear circuit element, at least one dissipative circuit element, and at least one time varying circuit element. In some embodiments, the nonlinear circuit element(s), dissipative circuit element(s), and/or time varying circuit element(s) may be combined into a single circuit element, such as a capacitor, inductor, and/or fractional memristor. For example, the circuit elements may be selected from capacitive circuit elements, inductive circuit elements, fractional memristive circuit elements and resistive circuit elements.

A system including a dissipative learning network, loss circuitry and a gradient estimator is described. The dissipative learning network is characterized by an action and has a trajectory corresponding to at least one input signal. The loss circuitry is selectively connectable to the dissipative learning network. The loss circuitry provides a perturbed trajectory for the dissipative learning network based on target outputs and the input signal(s). The gradient is estimator coupled with the dissipative learning network. The gradient estimator determines gradients for a portion of the dissipative learning network based on the trajectory and the perturbed trajectory. The gradient estimator also adjusts the portion of the dissipative learning network based on the gradients. In some embodiments, the dissipative learning network includes neuron banks interleaved with weighting arrays. Each of the weighting arrays may include programmable resistances. The portion of the dissipative learning network for which gradients are determined includes the weighting arrays. In some embodiments, the gradient estimator fractionally integrates the trajectory to provide a fractionally integrated trajectory and fractionally integrates the perturbed trajectory to provide a fractionally integrated perturbed trajectory. The gradient estimator also determines a difference between the fractionally integrated trajectory and the fractionally integrated perturbed trajectory for each weight in the weighting arrays. The difference corresponds to the gradient for each weight.

The gradient estimator may sample the weighting arrays to determine the gradients based on the perturbed trajectory and the trajectory and may adjust the weighting arrays based on the gradients. In some embodiments, the gradient estimator determines the trajectory by sampling the trajectory at a first time and a second time to identify a first sampled trajectory and a second sampled trajectory. The gradient estimator may also determine the perturbed trajectory by sampling the perturbed trajectory at a third time and a fourth time to identify a first sampled perturbed trajectory and a second sampled perturbed trajectory. To fractionally integrate the trajectory, the gradient estimator interpolates between the first sampled trajectory and the second sampled trajectory to provide a fractionally integrated sampled trajectory. Similarly, the gradient estimator may fractionally integrate the perturbed trajectory by interpolating between the first sampled perturbed trajectory and the second sampled perturbed trajectory to provide a fractionally integrated sampled perturbed trajectory. To determine the difference, the gradient estimator further determines a first difference between the fractionally integrated sampled trajectory and the fractionally integrated sampled perturbed trajectory for each weight in the plurality of weighting arrays. The first difference corresponds to the gradient for each weight.

Each of the neuron banks may include neurons including circuit elements. The plurality of circuit elements may include at least one nonlinear circuit element, at least one dissipative circuit element, and at least one time varying circuit element. In some embodiments, the nonlinear circuit element(s), dissipative circuit element(s), and/or time varying circuit element(s) may be combined into a single circuit element, such as a capacitor, inductor, and/or fractional memristor. In some embodiments, the circuit elements are selected from capacitive circuit elements, inductive circuit elements, fractional memristive circuit elements and resistive circuit elements.

A method for performing learning in a dissipative learning network is described. The dissipative learning network is characterized by an action. The method includes determining a trajectory for the dissipative learning network. The trajectory is in response to input signal(s). A perturbed trajectory is also determined for the dissipative learning network. The perturbed trajectory is determined based upon a loss function for the target outputs and the input signal(s). The method also includes adjusting a portion of the dissipative learning network based on the trajectory and the perturbed trajectory such that a minimum of the action corresponds to a loss function minimum. In some embodiments, the adjusting further includes determining gradients for the portion of the dissipative learning network based on the trajectory and the perturbed trajectory. The gradients corresponding to a convergence between the minimum of the action and the loss function minimum. The portion of the dissipative learning network is adjusted based on the gradients.

In some embodiments, determining the gradients includes fractionally integrating the trajectory to provide a fractionally integrated trajectory and fractionally integrating the perturbed trajectory to provide a fractionally integrated perturbed trajectory. Determining the gradients also includes determining a difference between the fractionally integrated trajectory and the fractionally integrated perturbed trajectory.

Figure 1:
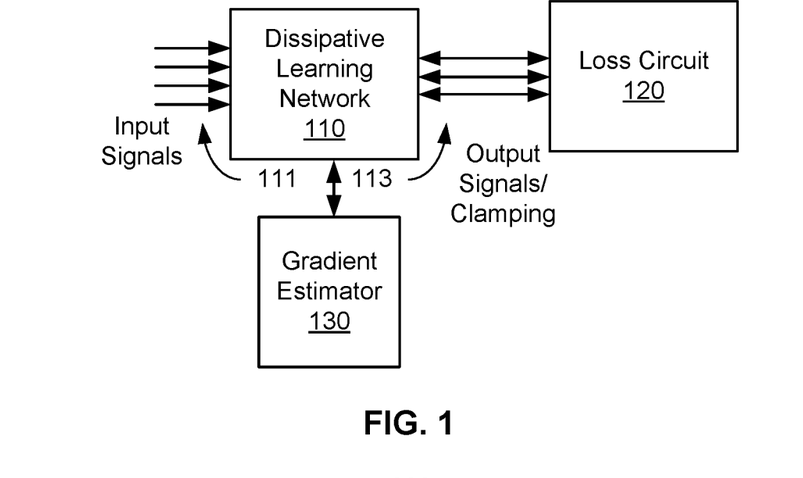
FIG. 1 is a block diagram of an embodiment of a learning system.

FIG. 1 is a block diagram of an embodiment of learning system 100 that includes dissipative learning network 110 and for which learning may be accomplished using gradient descent. For clarity, only some portions of learning system 100 are shown. In addition to dissipative learning network 110, learning system 100 includes loss circuit 120 and gradient estimator 130. Dissipative learning network 110 has inputs 111, outputs 113, and may be multi-layered. For example, dissipative learning network 110 may include multiple banks, or layers, of neurons interleaved with weighting arrays, or weighting layers. A neuron bank includes an array of neurons that are coupled to the weights in the adjacent weighting arrays. A weighting array, or layer, includes programmable weights, which are generally programmable resistances and may be arranged in an array. In some embodiments, the first layer of dissipative learning network 110 is a weighting array, while the last layer is a neuron bank. In some embodiments, the first and last layers of dissipative learning network 110 are weighting arrays. In some embodiments, the first layer of dissipative learning network is a neuron bank, while the last layer is a weighting array. Other combinations are possible. However, in general, the outputs from a weighting array are provided as inputs to a neuron bank and vice versa.

Dissipative learning network 110 includes dissipative and other time varying components. For example, learning network 110 may include resistive elements (e.g. positive and/or negative linear resistors and, at least in the weighting array, programmable resistors), capacitive elements (e.g. capacitors), memristive elements (e.g. fractional memristors that may be linear and/or nonlinear), and/or inductive elements (e.g. inductors). Dissipative learning network 110 may include nonlinear elements, such as fractional memristors. In some embodiments, the nonlinear circuit element(s), dissipative circuit element(s), and/or time varying circuit element(s) may be combined into a single circuit element, such as a capacitor, an inductor, and/or a fractional memristor. In some embodiments, the circuit elements are selected from capacitive circuit elements, inductive circuit elements, fractional memristive circuit elements and resistive circuit elements. In some embodiments, dissipative learning network 110 includes circuit elements having not more than two terminals (e.g. capacitor and inductors). For example, dissipative learning network 110 may include only circuit elements having not more than two terminals. However, the techniques described herein may be applied to dissipative learning networks including circuit elements having three or more terminals.

Loss circuit 120 is connectable to dissipative learning network 110. Thus, during use of learning system 100, loss circuit 120 may be coupled with dissipative learning network 110 for a portion of operation and decoupled (e.g. disabled and/or disconnected from) dissipative learning network 110 during another portion of operation of learning system 100. Loss circuit 120 determines a difference between output signals on outputs 113 of dissipative learning network 110 and target outputs which are desired to be matched. Stated differently, loss circuit 120 computes the time varying loss for dissipative learning network 110. Loss circuit 120 may thus be considered to evaluate a loss function over time. Loss circuit 120 may also provide signals to outputs 113 of dissipative learning network 113 that depends on the difference between the output signals and the target outputs. For example, loss circuit 120 may inject a current into outputs 113 that is a fraction of the difference between the output signals and the target outputs. As such, loss circuit 120 may be considered to clamp, or weakly clamp, the outputs 113 of dissipative learning network 110. In some embodiments, a mechanism other than a loss circuit may be used to clamp outputs 113 of dissipative learning network 110.

Gradient estimator 130 determines the gradients used in adjusting a portion of dissipative learning network 110 such that the output signals are driven toward the target outputs. In some embodiments, gradient estimator 130 determines gradients for the weights (e.g. programmable resistances) in the weighting arrays of dissipative learning network 110. In some embodiments, therefore, gradient estimator 130 is connected to each of the weighting arrays during use of dissipative learning system 110 and samples the weighting arrays. Because the input signals provided via inputs 111 and/or the components of dissipative learning network 110 vary in time, gradient estimator 130 performs this sampling over time and the values sampled change over time.

As discussed below, it has been determined that dissipative learning network 110 is characterized by an action. Dissipative learning network 110 is also characterized by trajectories. A trajectory of dissipative learning network 110 is the state of dissipative learning network 110 over time for particular conditions (e.g. particular input signals). For example, the trajectory of dissipative learning network 110 includes the values of an output of a portion of dissipative learning network 110 (e.g. a weight in a weighting array) takes on while input signals are applied to inputs 111. Because the input signals and/or elements of dissipative learning network 110 vary in time, the state of dissipative learning network 110 changes over time. Stated differently, dissipative learning network 110 may not settle to a particular static state (e.g. a single point or a single set of output values) during operation. Thus, instead, dissipative learning network has a trajectory for a particular set of input signals.

In operation, one or more trajectories are determined for dissipative learning network 110 for a set of input signals. These trajectories are determined with loss circuit 120 decoupled from dissipative learning network 110. Thus, the trajectories may be considered to indicate the natural evolution of dissipative learning network 110. In some embodiments, gradient estimator 130 determines at least part of the trajectory. One or more perturbed trajectories are determined for dissipative learning network 110. The perturbed trajectories are determined for the same set of input signals, but for which outputs 113 of dissipative learning network 110 have been perturbed to be closer to the target outputs than for the trajectories. For example, the perturbed trajectories may be determined for the input signals being applied to inputs 111 while loss circuit 120 is coupled with (i.e. enabled and connected to) dissipative learning network 110. Gradient estimator 130 also determines at least part of the perturbed trajectory for dissipative learning network 110. Based on the unperturbed and perturbed trajectories, gradient estimator 130 determines the gradients are adjusts the characteristics of dissipative learning network 110 to drive the output signals toward the target outputs. This process may be repeated until the desired match between the output signals and the target outputs is achieved.

Figure 2:
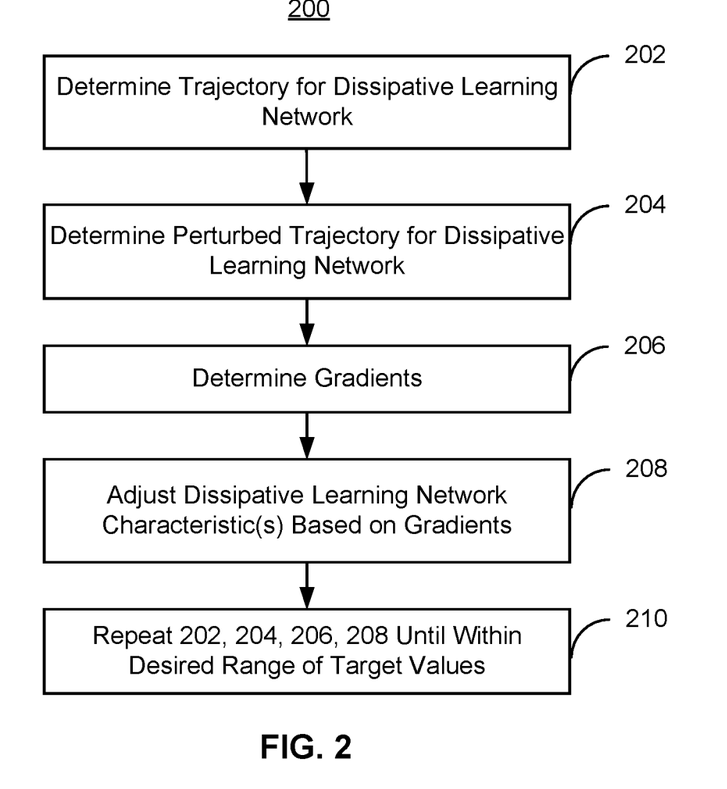
FIG. 2 is a flow chart of an embodiment of a method for performing learning using a dissipative learning network.

FIG. 2 is a flow chart of an embodiment of method 200 for performing learning using a dissipative learning network, such as dissipative learning network 110. Although particular steps are depicted, method 200 may include additional and/or other steps. Similarly, steps of method 200 may include substeps.

A trajectory is determined for the dissipative learning network, at 202. In some embodiments, determining the trajectory at 202 includes providing one or more input signals as inputs to the dissipative learning network and monitoring portions of the dissipative learning network.

A perturbed trajectory for the dissipative learning network is determined based on target outputs, at 204. In some embodiments, 204 includes providing the input signal(s) as inputs to the dissipative learning network and clamping the outputs of the dissipative learning network based on the target outputs. Clamping the outputs includes providing signals to the outputs of the dissipative learning network while the input signals are applied to the inputs. The signals provided to the outputs are based on a difference between the actual, unclamped output signals (e.g. those found at 202) and the target outputs. Stated differently, the signals provided are based on the loss. In some embodiments, a loss function is used to calculate the loss and provide the signals to the outputs. This loss function may vary from the difference between the actual output signals and the target outputs. For example, there may be a portion of the time for which loss is not calculated and the error in the outputs is ignored. This may occur for portions of the input signal that may not significantly affect the output signals. Also at 204, portions of the dissipative learning network are monitored to determine the trajectory.

Gradients for a portion of the dissipative learning network are determined based on the trajectory and the perturbed trajectory, at 206. In some embodiments, 206 includes fractionally integrating the trajectory with respect to time to provide a fractionally integrated trajectory. In such embodiments, determining the gradients at 206 also includes fractionally integrating the perturbed trajectory with respect to time to provide a fractionally integrated perturbed trajectory. The gradients are determined at 206 by determining a difference between the fractionally integrated trajectory and the fractionally integrated perturbed trajectory. For example, for gradients may be determined at 206 for each weight in the weighting arrays. In such embodiments, the difference between the fractionally integrated trajectory and the fractionally integrated perturbed trajectory corresponds to a gradient for each weight.

The portion of the dissipative learning network is adjusted based on the gradients, at 208. Thus, 208 includes changing one or more characteristics of the dissipative learning network. In some embodiments, the dissipative learning network includes neuron banks interleaved with weighting arrays. In such embodiments, the weight(s) of the weighting arrays are changed, at 208. At 210, method 200 is repeated until the output signals of the dissipative learning network are at or sufficiently near the target outputs.

For example, suppose method 200 is used in conjunction with learning system 100. Further, suppose that learning system 100 is being trained to recognize and categorize speech. For such embodiments, the input signals for inputs 111 may correspond to the frequencies versus time for an utterance (i.e. a spoken word). Thus, the input signals change over time. The target outputs may be a category for the word, target word corresponding to the utterance (e.g. a set of frequencies versus time that have been defined to correspond to the word), or other analogous output. The target output may thus be static or time varying. At 202, the input signals for the frequencies of the utterance are applied to inputs 111 of dissipative learning network 110 while loss circuit 120 is decoupled from outputs 113. While the input signals are provided, portions of dissipative learning network 110 (e.g. the weights) are monitored. In some embodiments, monitoring includes gradient estimator 130 sampling the characteristics across over time. For example, the voltage across each resistance corresponding to each weight may be sampled. Thus, the trajectory is determined.

At 204, the input signals for the utterance are applied to inputs 111 of dissipative learning network 110 while loss circuit 120 is coupled to outputs 113. Thus, loss circuit 120 computes the loss (e.g. the difference between the output signal and the target output) over time and provides a signal to outputs 113 that is based on the loss. While the input signals are provided and loss circuit 120 is coupled to outputs 113, portions of the network (e.g. the weights) are monitored. In some embodiments, monitoring includes gradient estimator 130 sampling the characteristics across over time. For example, the voltage across each resistance corresponding to each weight is sampled. Thus, the perturbed trajectory is determined.

At 206, gradient estimator 130 determines the gradients by fractionally integrating the trajectory, fractionally integrating the perturbed trajectory and determining a difference. For example, gradient estimator 130 may interpolate between sampled trajectories to provide the fractionally integrated trajectory and interpolate between sampled perturbed trajectories to provide the fractionally integrated perturbed trajectory. Also at 206, gradient estimator 130 determines the difference between the fractionally integrated trajectory and the fractionally integrated perturbed trajectory. The first difference corresponds to the gradient for each weight.

At 208, gradient estimator 130 adjusts dissipative learning network 110 based on the gradients. For example, gradient estimator 130 may update the weights by changing the resistances in the weighting array at 208. This process may be repeated at 210 until the desired outputs are obtained. For example, the category of the utterance matches the corresponding word or the set of frequencies versus time matches that of the word.

Using method 200, machine learning may be performed in dissipative learning network 110. More specifically, gradients can be locally determined and gradient descent used in a learning network that includes time varying, dissipative elements. Using gradient descent, the weights may be better able to be adjusted to the desired values. Efficiency of learning may thus be enhanced. Performance of dissipative learning networks and the applications with which such networks may be used may be improved.

As discussed above, the systems and methods described herein may be used in performing machine learning and, in particular, applying a variation of equilibrium propagation to time varying, dissipative learning networks. The extension of equilibrium propagation techniques to time varying, dissipative learning networks may be understood in the context of an action. Stated differently, it has been determined that the action for the systems may be used in performing machine learning. The action is the time integral of the Lagrangian for the system. In mechanics, the Lagrangian may be considered to include spatial coordinates and velocities (i.e. the derivative with respect to time of the spatial coordinates). For the electrical circuitry, it has been determined that the charge and flux correspond to the spatial coordinates, while the current and voltage correspond to the velocities. For such a circuit, the Lagrangian may be described as:

$$S = \int_a^b \mathcal{L}(t, z, \dot{z}, {}_a^C D_t^{1/2} \hat{f}(z),) dt$$

In such a Lagrangian, t is time, z corresponds to charge or flux, the time derivative of z is current or voltage, respectively, and $D^{1/2}_t$ is the fractional derivative term for the dissipation.

In the learning network described above, the terms of the Lagrangian defined above may be separated out. This is indicated below.

$$\mathcal{L} = \underbrace{\sum_k -\int_0^{i_{L,k}} A_k(i'_k) di'_k}_{Inductors} + \underbrace{\sum_l \frac{j}{2} ({}_a^C D_t^{1/2} f_l(q_{M,l}))^2}_{Memristors} - \underbrace{\sum_m \int_0^{q_{C,m}} G(q'_m) dq'_m}_{Capacitors}$$

Thus, the circuit elements in the linear network and resistance arrays may be represented in the Lagrangian. Further, the loss circuit described above can be used to determine the loss functional for the network. The loss function corresponds to the error between the targets and unperturbed states. In some embodiments, a partition Lagrangian that isolates parameters and loss from the neurons as well as indicating the constraints for the Lagrangian (e.g. Kirchhoff's laws for the circuit elements), may be determined. One such Lagrangian is indicated below.

$$\mathcal{L} = \sum_l^L \frac{j}{2} ({}_a^C D_t^{1/2} \sqrt{R_l} q_l)^2 - \sum_k^K \beta C(v_k(t) - T_k(t))^2 + \mathcal{L}_H$$

Further, the gradient of the parameters may be computed from the following:

$$\frac{dJ}{dR_i} = \frac{-j}{2C} \lim_{\beta \to 0} \frac{1}{\beta} \left[ \int_{t_1}^{t_2} ({}_a^C D_t^{1/2} q_j(\beta, t))^2 dt - \int_{t_1}^{t_2} ({}_a^C D_t^{1/2} q_j(0, t))^2 dt \right]$$

This gradient may be determined using the process described above.

Figure 3:
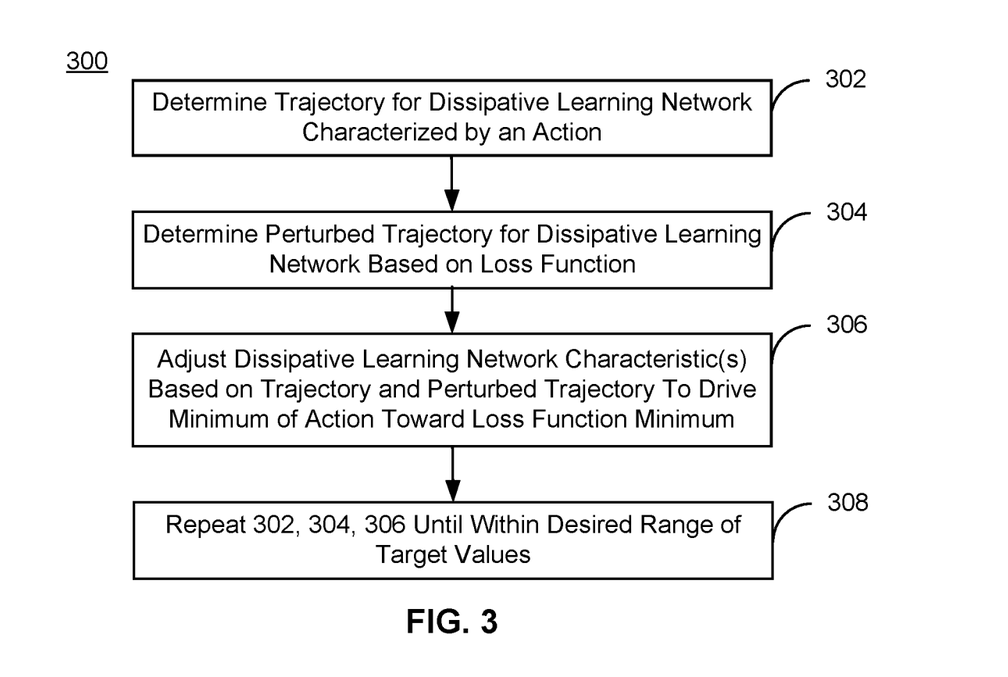
FIG. 3 is a flow chart of another embodiment of a method for performing learning using a dissipative learning network.

For example, FIG. 3 is a flow chart of another embodiment of method 300 for performing learning using a dissipative learning network, such as dissipative learning network 110. Although particular steps are depicted, method 300 may include additional and/or other steps. Similarly, steps of method 300 may include substeps. Method 300 is analogous to method 200 but is described in the context of the action.

A trajectory for the dissipative learning network is determined, at 302. The dissipative learning network is characterized by its action, as well as the trajectory. In some embodiments, 302 is analogous to 202 of method 200.

A perturbed trajectory is also determined for the dissipative learning network, at 304. The perturbed trajectory is determined based upon a loss function for the target outputs and the input signal(s). In some embodiments, 304 is analogous to 204 of method 200.

A portion of the dissipative learning network is adjusted based on the trajectory and the perturbed trajectory such that a minimum of the action is driven toward a loss function minimum, at 306. In some embodiments, the adjusting further includes determining gradients for the portion of the dissipative learning network based on the trajectory and the perturbed trajectory. This process may be carried out in a manner analogous to that described in the context of 206 and 208 of method 200. Thus, the gradients may be determined and used to alter characteristics of the dissipative learning network. These gradients correspond to a convergence between the minimum of the action and the loss function minimum. In some embodiments, 306 corresponds to 206 and 208 of method 200. At 308, 302, 304, and 306 are repeated until the output signals of the dissipative learning network are at or sufficiently near the target outputs. Thus, 306 and 308 may be viewed as adjusting the dissipative learning network based on the trajectory and the perturbed trajectory such that a minimum of the action corresponds to a loss function minimum.

Using method 300, machine learning may be performed in dissipative learning networks. More specifically, gradients can be locally determined and gradient descent used in a learning network that includes time varying, dissipative elements. Determination of the gradients and application of the gradients in adjusting characteristics of the network is analogous to changing the characteristics of the network such that the minimum in the action aligns with the minimum in the loss function. Thus, the weights may be better able to be adjusted to the desired values. Efficiency of learning may thus be enhanced. Performance of dissipative learning networks and the applications with which such networks may be used may be improved.

Figure 4:
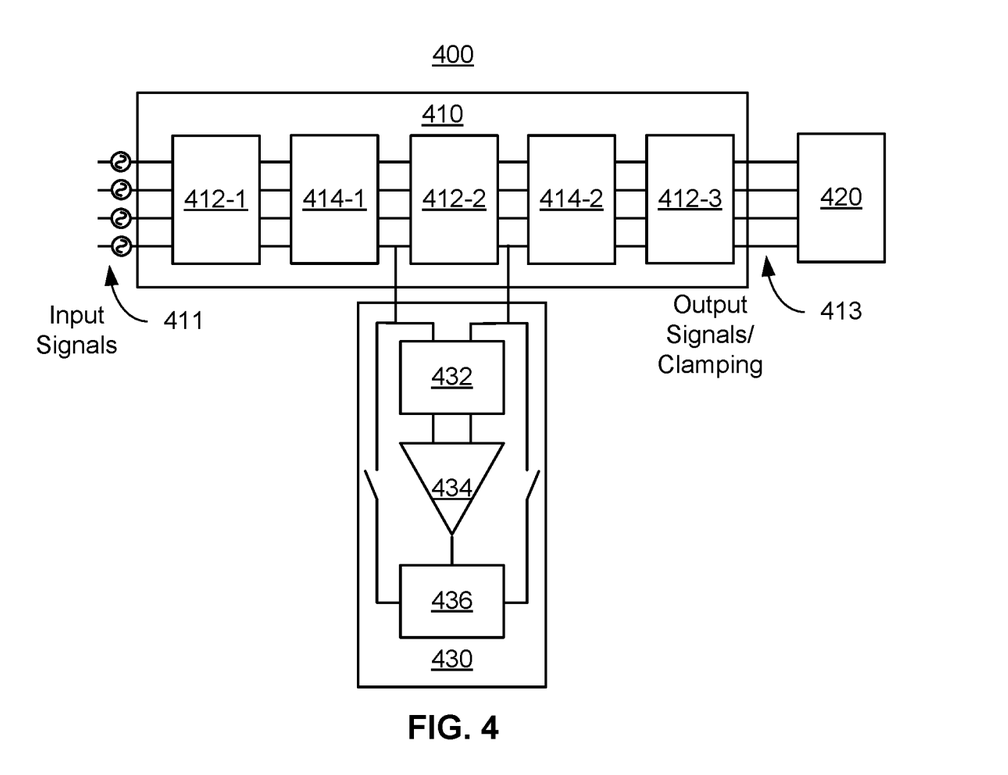
FIG. 4 is a diagram of an embodiment of a learning system.

FIG. 4 is a diagram of an embodiment of learning system 400 that includes dissipative learning network 410, loss circuit 420, and gradient estimator 430. For clarity, only some portions of learning system 400 are shown. Dissipative learning network 410, loss circuit 420, and gradient estimator 430 are analogous to dissipative learning network 110, loss circuit 120, and gradient estimator 130, respectively. Thus, learning may be accomplished for learning system 400 using gradient descent. For clarity, only some portions of learning system 400 are shown.

Dissipative learning network 410 has inputs 411, outputs 413 that are analogous to inputs 111 and outputs 113, respectively. Dissipative learning network 410 is explicitly multi-layered. Thus, dissipative learning network 410 includes multiple neuron banks 414-1, and 414-2 (collectively or generically 414) interleaved with weighting arrays 412-1, 412-2, and 412-3 (collectively or generically 412).

Although a certain number and configuration of neuron banks 414 and weighting arrays 412 are shown, other combinations are possible. Each weighting array 412 includes programmable resistances. Each neuron bank 414 includes an array of neurons that are coupled to the weights in the adjacent weighting arrays 412. Banks 414 include circuit elements that are dissipative, time varying, and/or nonlinear.

Figure 5:
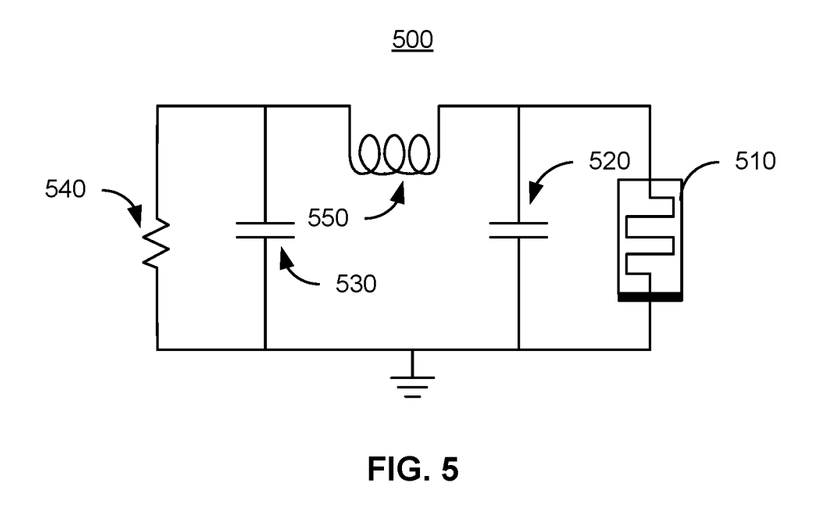
FIG. 5 is a diagram of an embodiment of a neuron for a dissipative learning network.

For example, FIG. 5 is a diagram of an embodiment of neuron 500 that may be used in a dissipative learning network. Thus, neuron 500 may be used in neuron banks 414 of dissipative learning network 410. Neuron 500 includes fractional memristor 510 (a nonlinear circuit element), capacitors 520 and 530 (time varying circuit elements), a negative linear resistor 540 (a dissipative circuit element), and inductor 550 (a dissipative circuit element). The neuron circuit in FIG. 5 is simple and may generate chaos, which may be desirable. However, other configurations and/or other circuit elements may be used. For example, a neuron may include positive linear resistors, fractional nonlinear memristors, linear voltage sources and/or linear current sources. Neuron 500 includes only circuit elements having not more than two terminals (e.g. capacitor and inductors). However, the techniques described herein may be applied to neurons including circuit elements having three or more terminals.

Referring back to FIG. 4, dissipative learning system 410 is characterized by a trajectory and an action. The trajectory of dissipative learning system 401 indicates the states of components of neuron banks 414 and weighting arrays 412 over time.

Loss circuit 420 is analogous to loss circuit 120. Loss circuit 420 is connectable to dissipative learning network 410. Loss circuit 420 determines a difference between output signals on outputs 413 of dissipative learning network 410 and target outputs which are desired to be matched. Loss circuit 420 may inject a current into (or apply a voltage to) outputs 413 that is a based on the difference between the output signals and the target outputs. As such, loss circuit 420 may be considered to clamp, or weakly clamp, the outputs 413 of dissipative learning network 410 based on the target outputs. The loss circuit 420 may also include energy storage components (e.g. capacitors) that can store an energy difference between the output of the learning network and target outputs (not shown) to which dissipative learning network 410 may be selectively coupled via loss circuit 420. Thus, loss circuit 420 may be viewed as coupling dissipative learning network 410 to the target outputs.

Gradient estimator 430 includes fractional integrator 432, comparator 434, and pulse generator 436. In other embodiments, gradient estimator 430 may be configured in a different manner. Gradient estimator 430 is depicted as sampling a particular, single weighting array 412-2. In some embodiments, multiple gradient estimators 430 are incorporated for sampling multiple weighting arrays 412. In some embodiments, gradient estimator 430 is configured to sample multiple weighting arrays substantially simultaneously. Also shown are network inputs that provide input signals to the learning network.

Gradient estimator 430 is configured to sample weighting arrays 412 to determine gradients based on the perturbed trajectory and the trajectory. Gradient estimator 430 may also be configured to adjust the weighting arrays based on the gradients. Gradient estimator 430 may be configured to fractionally integrate the trajectory to provide a fractionally integrated trajectory, store the fractionally integrated trajectory, fractionally integrate the perturbed trajectory to provide a fractionally integrated perturbed trajectory and store the fractionally integrated perturbed trajectory. Gradient estimator 430 may also determine a difference between the fractionally integrated trajectory and the fractionally integrated perturbed trajectory for each weight in the weighting arrays. The difference corresponds to a gradient for each weight.

In some embodiments, gradient estimator 430 is further configured to sample the trajectory at a first time and a second time to identify a first sampled trajectory and a second sampled trajectory; sample the perturbed trajectory at a third time and a fourth time to identify a first sampled perturbed trajectory and a second sampled perturbed trajectory; interpolate between the first sampled trajectory and the second sampled trajectory to provide a fractionally integrated sampled trajectory; and interpolate between the first sampled perturbed trajectory and the second sampled perturbed trajectory to provide a fractionally integrated sampled perturbed trajectory. The gradient estimator may also determine a difference between the fractionally integrated sampled trajectory and the fractionally integrated sampled perturbed trajectory for each weight. The difference corresponds to a gradient for the weight.

Figure 6:
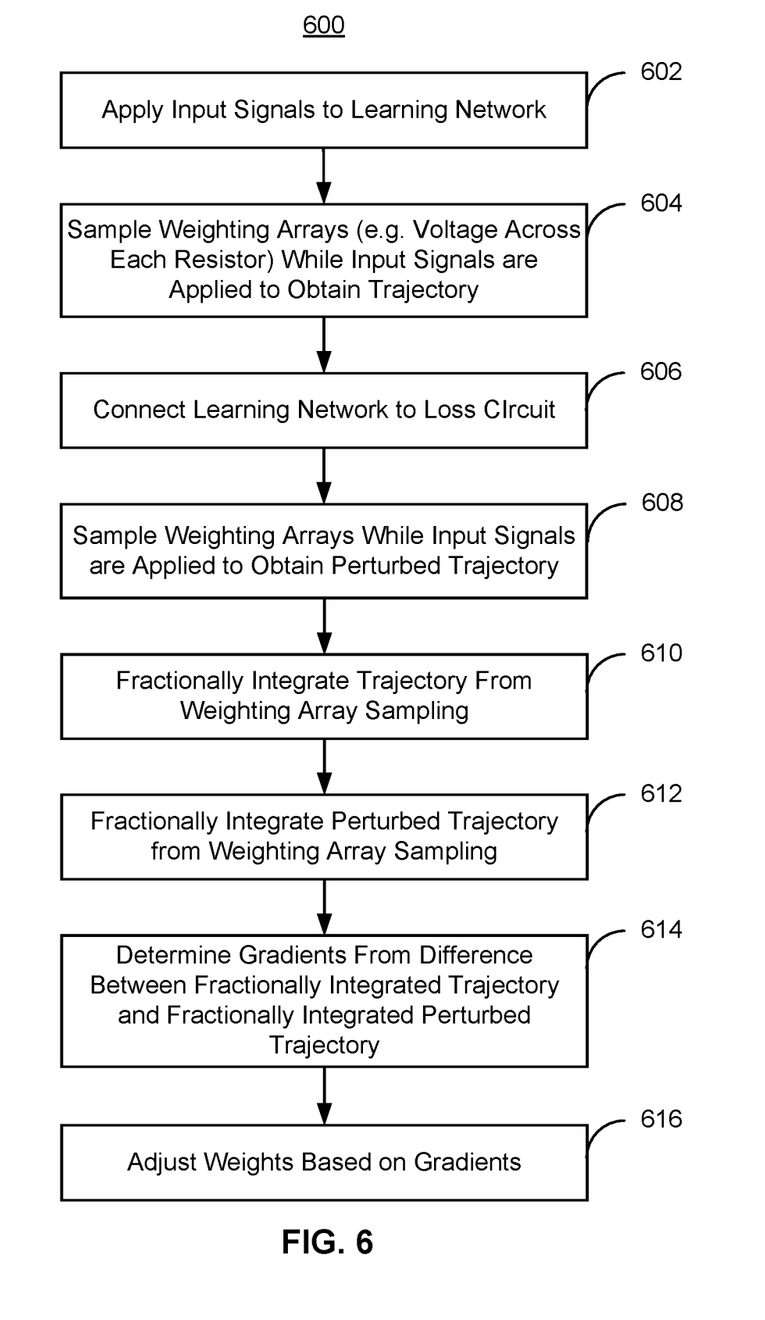
FIG. 6 is a flow chart of another embodiment of a method for performing learning using a dissipative learning network.

FIG. 6 is a flow chart of an embodiment of method 600 for performing learning using a dissipative learning network having neuron banks interleaved with weighting arrays, such as dissipative learning network 410. In order to perform learning, gradients are determined and utilized in method 600. Although particular steps are depicted, method 600 may include additional and/or other steps. Similarly, steps of method 600 may include substeps.

Input signals are applied to the dissipative learning network, at 602. A trajectory is determined for the dissipative learning network, at 604. To do so, the weighting arrays are sampled while the input signals are applied. For example, the voltage across each resistor in each weighting array is determined over time. In some embodiments, the gradient estimator is used to sample the weighting arrays at 604. Thus, a trajectory for the dissipative learning network is determined.

The dissipative learning network is coupled to a loss circuit, at 606. In some embodiments, another mechanism for clamping the outputs may be used in lieu of a loss circuit. A perturbed trajectory for the dissipative learning network is determined based on target outputs, at 608. To do so, the weighting arrays are sampled while the input signals are applied and while the dissipative learning network is coupled to the loss circuit. For example, the voltage across each resistor in each weighting array is determined over time. In some embodiments, the gradient estimator is used to sample the weighting arrays at 608. Thus, a perturbed trajectory is determined.

The trajectory is fractionally integrated with respect to time, at 610. The perturbed trajectory is also fractionally integrated with respect to time, at 612. The gradients are determined at 614 by determining a difference between the fractionally integrated trajectory and the fractionally integrated perturbed trajectory. Thus, gradients may be determined by the gradient estimator at 614 for each weight in the weighting arrays.

The weights in the weighting arrays of the dissipative learning network are adjusted based on the gradients, at 616. Gradient estimator may thus program one or more of the programmable resistors of the weighting arrays. Method 600 may be repeated until the output of the dissipative learning network is within the desired tolerances of the target outputs.

For example, suppose method 600 is used in conjunction with learning system 400. Input signals are applied to inputs 411 of dissipative learning network 410, at 602. As indicated in FIG. 4, the input signals may vary in time. A trajectory is determined for dissipative learning network 410, at 604. To do so, weighting arrays 412 are sampled while the input signals are applied. For example, the voltage across each resistor, or weight, in each weighting array 412 is sampled at various times by gradient estimator 430. Thus, a trajectory for dissipative learning network 410 is determined.

Loss circuit 420 is coupled to dissipative learning network 410, at 606. A perturbed trajectory for dissipative learning network 410 is determined based on target outputs, at 608. To do so, weighting arrays 412 are again sampled by gradient estimator 430. This sampling occurs while the input signals are applied and while dissipative learning network 410 is coupled to loss circuit 420. For example, the voltage across each resistor in each weighting array 412 is determined over time. Thus, a perturbed trajectory is determined.

Gradient estimator 430 utilizes fractional integrator 432 to fractionally integrate the trajectory with respect to time, at 610. For example, the trajectory may be determined at 604 by sampling weighted arrays 412 (i.e. the trajectory) at a first time and a second time to identify a first sampled trajectory and a second sampled trajectory. Fractionally integrating the trajectory at 608 includes interpolating between the first sampled trajectory and the second sampled trajectory to provide a fractionally integrated sampled trajectory. This process is repeated for multiple samples of the trajectory (e.g. for multiple samples of the voltage across each resistor in each weighting array 412).

The perturbed trajectory is also fractionally integrated with respect to time using fractional integrator, at 612. For example, the perturbed trajectory may be determined at 608 by sampling the weighted arrays 412 (i.e. the perturbed trajectory) at a third time and a fourth time to identify a first sampled perturbed trajectory and a second sampled perturbed trajectory. Note that nothing requires the third time and the fourth time to be different from the first time and second time described above. Fractionally integrating the perturbed trajectory includes interpolating between the first sampled perturbed trajectory and the second sampled perturbed trajectory to provide a fractionally integrated sampled perturbed trajectory. This process is repeated for multiple samples of the perturbed trajectory (e.g. for multiple samples of the voltage across each resistor in each weighting array 412 while loss circuit 420 is coupled to outputs 413).

Gradient estimator 430 determines the gradients at 614 by determining a difference between the fractionally integrated trajectory and the fractionally integrated perturbed trajectory. The difference may be determined using comparator 434. The trajectory and perturbed trajectory may be identified by sampling weighting arrays 412. Determining the difference between the fractionally integrated and fractionally integrated perturbed trajectories may thus include determining a first difference between the fractionally integrated sampled trajectory and the fractionally integrated sampled perturbed trajectory for each weight in the weighting arrays. Thus, gradients may be determined by gradient estimator 430 for each weight in the weighting arrays.

Gradient estimator 430 updates the weights in weighting arrays 412 based on the gradients, at 616. To do so, gradient estimator 430 uses pulse generator 436 to program one or more of the programmable resistors of the weighting arrays. Method 600 may be repeated until the output of the dissipative learning network is within the desired tolerances of the target outputs.

Using method 600, machine learning may be performed in dissipative learning network 410. More specifically, gradients can be locally determined and gradient descent used in a learning network that includes time varying and/or dissipative elements. Using gradient descent, the weights may be better able to be adjusted to the desired values. Efficiency of learning may thus be enhanced. Performance of dissipative learning networks and the applications with which such networks may be used may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining a trajectory for a dissipative learning network, the dissipative learning network including a plurality of neuron banks and at least one plurality of weights, a plurality of weights of the at least one plurality of weights being between a first neuron bank and a second neuron bank of the plurality of neuron banks, at least one of the plurality of neuron banks or the at least one plurality of weights including an electrical component that dissipates energy, the trajectory including a plurality of states of the dissipative learning network for a first plurality of times and being for at least one input signal;
   determining a perturbed trajectory for the dissipative learning network based on a plurality of target outputs, the perturbed trajectory including a plurality of perturbed states of the dissipative learning network for a second plurality of times based on the plurality of target outputs and being for the at least one input signal;
   determining gradients for a portion of the dissipative learning network based on the trajectory and the perturbed trajectory, the portion of the dissipative learning network including the plurality of weights; and
   adjusting the portion of the dissipative learning network based on the gradients.

2. The method of claim 1, wherein the determining the gradients further includes:
   fractionally integrating the trajectory to provide a fractionally integrated trajectory;
   fractionally integrating the perturbed trajectory to provide a fractionally integrated perturbed trajectory; and
   determining a difference between the fractionally integrated trajectory and the fractionally integrated perturbed trajectory for a weight in the at least one plurality of weights, the difference corresponding to a gradient for each weight.

3. The method of claim 2, wherein the determining the trajectory further includes:
   sampling the trajectory at a first time and a second time to identify a first sampled trajectory and a second sampled trajectory;
   wherein the determining the perturbed trajectory further includes sampling the perturbed trajectory at a third time and a fourth time to identify a first sampled perturbed trajectory and a second sampled perturbed trajectory;
   wherein the fractionally integrating the trajectory includes interpolating between the first sampled trajectory and the second sampled trajectory to provide a fractionally integrated sampled trajectory;

wherein the fractionally integrating the perturbed trajectory includes interpolating between the first sampled perturbed trajectory and the second sampled perturbed trajectory to provide a fractionally integrated sampled perturbed trajectory; and wherein the determining the difference further includes determining a first difference between the fractionally integrated sampled trajectory and the fractionally integrated sampled perturbed trajectory for the weight in the at least one plurality of weights, the first difference corresponding to the gradient for each weight.

4. The method of claim 1, wherein the determining the trajectory includes:
providing at least one input signal to the dissipative learning network; and
sampling at least a portion of the at least one plurality of weights for the first plurality of times while the at least one input signal is provided.

5. The method of claim 4, wherein the determining the perturbed trajectory further includes:
coupling the dissipative learning network to a loss circuit, wherein the loss circuit determines a difference between at least one output signal from the dissipative learning network and the target outputs and provides clamping signals to the dissipative learning network based on the difference;
providing the at least one input signal to the dissipative learning network while the dissipative learning network is coupled to the loss circuit; and
sampling the at least one plurality of weights for the second plurality of times while the at least one input signal is provided to the dissipative learning network and the dissipative learning network is coupled to the loss circuit.

6. The method of claim 1, wherein each of the plurality of neuron banks includes a plurality of neurons including plurality of circuit elements, the plurality of circuit elements including at least one nonlinear circuit element, at least one dissipative circuit element, and at least one time varying circuit element.

7. The method of claim 6, wherein the plurality of circuit elements are selected from capacitive circuit elements, inductive circuit elements, fractional memristive circuit elements and resistive circuit elements.

8. The method of claim 1, wherein the determining the trajectory further includes:
sampling a first portion of the plurality of states of the dissipative learning network at a first time; and
sampling a second portion of the plurality of states of the dissipative learning network at a second time;
wherein determining the perturbed trajectory further includes sampling a third portion of the plurality of perturbed states of the dissipative learning network at a third time; and
sampling a fourth portion of the plurality of perturbed states of the dissipative learning network at a fourth time; and
wherein the determining the gradients further includes interpolating between the first portion of the plurality of states and the second portion of the plurality of states to provide an interpolated trajectory;
interpolating between the third portion of the plurality of perturbed states and the fourth portion of the plurality of perturbed states to provide an interpolated perturbed trajectory;

determining a difference between the interpolated sampled trajectory and the interpolated perturbed trajectory for each of the at least one weighting array.

9. The method of claim 1, wherein the dissipative learning network includes at least one circuit element having a circuit element state that varies over time for the at least one input signal.

10. A system, comprising:
a dissipative learning network characterized by an action and having a trajectory corresponding to at least one input signal, the dissipative learning network including a plurality of neuron banks and a plurality of weighting arrays, at least one of the plurality of weighting arrays being between a first neuron bank and a second neuron bank of the plurality of neuron banks, at least one of the plurality of neuron banks or the plurality of weighting arrays including an electrical component that dissipates energy, the trajectory including a plurality of states of the dissipative learning network for a first plurality of times and being for at least one input signal;
loss circuitry selectively connectable to the dissipative learning network, the loss circuitry providing a perturbed trajectory for the dissipative learning network based on a plurality of target outputs and the at least one input signal, the perturbed trajectory including a plurality of perturbed states of the dissipative learning network for a second plurality of times based on the plurality of target outputs and being for the at least one input signal; and
gradient estimator coupled with the dissipative learning network, wherein the gradient estimator determines gradients for a portion of the dissipative learning network based on the trajectory and the perturbed trajectory and adjusts the portion of the dissipative learning network based on the gradients, the portion of the dissipative learning network including the plurality of weighting array.

11. The system of claim 10, wherein the gradient estimator further:
fractionally integrates the trajectory to provide a fractionally integrated trajectory;
fractionally integrates the perturbed trajectory to provide a fractionally integrated perturbed trajectory; and
determines a difference between the fractionally integrated trajectory and the fractionally integrated perturbed trajectory for a weight in the plurality of weighting arrays, the difference corresponding to a gradient for the weight.

12. The system of claim 11, wherein to determine the trajectory, the gradient estimator samples the trajectory at a first time and a second time to identify a first sampled trajectory and a second sampled trajectory;
wherein to determine the perturbed trajectory the gradient estimator further samples the perturbed trajectory at a third time and a fourth time to identify a first sampled perturbed trajectory and a second sampled perturbed trajectory;
wherein to fractionally integrate the trajectory, the gradient estimator interpolates between the first sampled trajectory and the second sampled trajectory to provide a fractionally integrated sampled trajectory;
wherein to fractionally integrate the perturbed trajectory, the gradient estimator interpolates between the first sampled perturbed trajectory and the second sampled perturbed trajectory to provide a fractionally integrated sampled perturbed trajectory; and wherein to determine the difference, the gradient estimator further determines a first difference between the fractionally integrated sampled trajectory and the fractionally integrated sampled perturbed trajectory for each weight in the plurality of weighting arrays, the first difference corresponding to the gradient for each weight.

13. The system of claim 10, wherein the gradient estimator further samples the weighting arrays to determine the gradients based on the perturbed trajectory and the trajectory, the gradient estimator configured to adjust the plurality of weighting arrays based on the gradients.

14. The system of claim 10, wherein each of the plurality of neuron banks includes a plurality of neurons including plurality of circuit elements, the plurality of circuit elements including at least one nonlinear circuit element, at least one dissipative circuit element, and at least one time varying circuit element.

15. The system of claim 14, wherein the plurality of circuit elements are selected from capacitive circuit elements, inductive circuit elements, fractional memristive circuit elements and resistive circuit elements.

16. The system of claim 10, wherein each of the plurality of weighting arrays includes programmable resistances.

17. The system of claim 10, wherein to determine the gradients, the gradient estimator is further configured to:
sample a first portion of the plurality of states of the dissipative learning network at a first time;
sample a second portion of the plurality of states of the dissipative learning network at a second time;
sample a third portion of the plurality of perturbed states of the dissipative learning network at a third time;
sample a fourth portion of the plurality of perturbed states of the dissipative learning network at a fourth time;
interpolate between the first portion of the plurality of states and the second portion of the plurality of states to provide an interpolated trajectory;
interpolate between the third portion of the plurality of perturbed states and the fourth portion of the plurality of perturbed states to provide an interpolated perturbed trajectory; and
determine a difference between the interpolated trajectory and the interpolated perturbed trajectory for each of the plurality of weighting arrays.

18. A method, comprising:
determining a trajectory for a dissipative learning network, the dissipative learning network including a plurality of neuron banks and a plurality of weighting arrays, at least one of the plurality of weighting arrays being between a first neuron bank and a second neuron bank of the plurality of neuron banks, at least one of the plurality of neuron banks or the at least one weighting array including an electrical component that dissipates energy, the trajectory including a plurality of states of a plurality of electrical components in the dissipative learning network for a first plurality of times and being in response to at least one input signal, the dissipative learning network being characterized by an action;
determining a perturbed trajectory for the dissipative learning network based upon a loss function for a plurality of target outputs and the at least one input signal, the perturbed trajectory including a plurality of perturbed states of the plurality of electrical components in the dissipative learning network for a second plurality of times; and
adjusting a portion of the dissipative learning network based on the trajectory and the perturbed trajectory such that a minimum of the action corresponds to a loss function minimum.

19. The method of claim 18, wherein the adjusting further includes:
determining gradients for the portion of the dissipative learning network based on the trajectory and the perturbed trajectory, the gradients corresponding to a convergence between the minimum of the action and the loss function minimum; and
adjusting the portion of the dissipative learning network based on the gradients.

20. The method of claim 19, wherein the determining the gradients further includes:
fractionally integrating the trajectory to provide a fractionally integrated trajectory;
fractionally integrating the perturbed trajectory to provide a fractionally integrated perturbed trajectory; and
determining a difference between the fractionally integrated trajectory and the fractionally integrated perturbed trajectory.

21. The method of claim 19, wherein the dissipative learning network includes a plurality of circuit elements, the plurality of circuit elements including at least one nonlinear circuit element, at least one dissipative circuit element, and at least one time varying circuit element.

* * * * *